United States Patent [19]

French

[11] 3,983,918
[45] Oct. 5, 1976

[54] PNEUMATIC TIRES
[75] Inventor: Tom French, Sutton Coldfield, England
[73] Assignee: Dunlop Holdings Limited, England
[22] Filed: July 29, 1974
[21] Appl. No.: 492,750

Related U.S. Application Data
[63] Continuation of Ser. No. 232,850, March 8, 1972, abandoned.

[30] Foreign Application Priority Data
Mar. 16, 1971 United Kingdom............... 7024/71

[52] U.S. Cl. ................... 152/353 R; 152/209 WT; 152/330 RF; 152/379 S; 152/381 A
[51] Int. Cl.² ................... B60B 19/00; B60B 21/10; B60C 13/00; B60C 17/00
[58] Field of Search.......... 152/158, 209 WT, 209 R, 152/330 R, 330 RF, 352, 353, 362 R, 363, 375, 378 R, 379 S, 353 R, 381 A

[56] References Cited
UNITED STATES PATENTS

| | | | |
|---|---|---|---|
| 1,337,660 | 4/1920 | Killen.............................. | 152/352 |
| 1,433,008 | 10/1922 | Hawley........................ | 152/209 WT |
| 1,822,320 | 9/1931 | Shoemaker.................... | 152/378 R |
| 1,921,772 | 8/1933 | Paull............................. | 152/352 |
| 2,534,869 | 12/1950 | Jones............................ | 152/209 R |
| 2,977,151 | 3/1961 | Ford, Jr. ...................... | 152/353 |
| 2,996,099 | 8/1961 | McCall.......................... | 152/362 R |
| 3,117,614 | 1/1964 | Amici............................ | 152/363 |
| 3,118,482 | 1/1964 | Beissner........................ | 152/362 R |
| 3,203,461 | 8/1965 | Enabnit......................... | 152/362 R |
| 3,394,751 | 7/1968 | Sidles et al.................... | 152/330 R |
| 3,421,566 | 1/1969 | Sidles et al.................... | 152/330 R |
| 3,515,196 | 6/1970 | Floria............................ | 152/352 |
| 3,610,308 | 10/1971 | McDonald..................... | 152/158 |
| 3,610,310 | 10/1971 | Wittneben.................... | 152/330 RF |
| 3,631,913 | 1/1972 | Boileau......................... | 152/353 |
| 3,669,174 | 6/1972 | Mills............................. | 152/379 S |
| 3,682,218 | 3/1972 | Johannsen et al. ............ | 152/158 |
| 3,739,829 | 6/1973 | Powell et al. ................. | 152/330 R |

FOREIGN PATENTS OR APPLICATIONS

| | | | |
|---|---|---|---|
| 527,731 | 7/1956 | Canada......................... | 152/352 |
| 1,810,740 | 8/1969 | Germany...................... | 152/352 |
| 13,727 | 2/1926 | Netherlands................... | 152/352 |

Primary Examiner—Robert J. Spar
Assistant Examiner—Howard Beltran
Attorney, Agent, or Firm—Stevens, Davis, Miller & Mosher

[57] ABSTRACT

A tire and a tire and wheel assembly in which the wheel rim has axially-outwardly-extending portions adjacent the bead seats and the tire has in the lower sidewall region a rubber buttress having a substantially axially-outwardly-extending radially inner face. This buttress is capable of tangential flexing relative to the wheel rim so that on deflation of the tire the radially inner face of the buttress contacts the axially-outwardly-extending rim portions to support the tire sidewall and accommodate relative movement between the wheel rim and the tire sidewall.

18 Claims, 4 Drawing Figures

PNEUMATIC TIRES

This application is a continuation of copending application Ser. No. 232,850, filed Mar. 8, 1972, now abandoned.

This invention relates to wheel and tire assemblies and is an improvement in or modification of the invention described in U.S. pat. application Ser. No. 150,628, filed June 7, 1971, abandoned in favor of U.S. continuation application Ser. No. 393,249, filed Sept. 20, 1973, now U.S. Pat. No. 3,930,527, issued Jan. 6, 1976.

In U.S. application Ser. No. 150,628 and U.S. Pat. No. 3,930,527 there is described a wheel having a pair of spaced apart seats for the reception of tire beads, annular substantially axially-outwardly extending rim portions of the wheel being provided one adjacent to each bead-seat and forming faces against which a sidewall of a tire can be deflected and supported. The axially-outwardly-extending rim portions of the wheel reduce the pressure concentration between the sidewall of a tire and the wheel rim flanges when the tire is, for example, punctured and collapses on to the rim.

When this occurs, however, both the tire sidewall and the axially-outwardly-extending rim portions rotate at the same angular velocity but have differing circumferences. Relative movement of the collapsed sidewall and the rim portion with which it is in contact must therefore occur during rotation of the wheel and severe abrasion can be caused if, as when the axially-outwardly-extending rim portions are wide, the outer edge of the rim contacts a point high on the sidewall.

According to the present invention a wheel and tire assembly comprises a wheel having a pair of spaced apart seats for the reception of tyre beads, annular substantially axially-outwardly-extending rim portions of the wheel adjacent to each bead seat and forming faces against which a sidewall of a tire can be deflected and supported and a tire mounted on said wheel the tire having in the lower sidewall region a rubber buttress having a substantially axially-outwardly-extending radially inner face and being capable of tangential flexing relative to the wheel rim whereby on deflation of the tire the radially inner face of the buttress comes into contact with the axially-outwardly-extending rim portions of the wheel to support the sidewall of the tire and accommodate relative movement between the wheel rim and the sidewall.

According to the invention also a pneumatic tire comprises a tread, flexible carcass and beads and includes in the lower sidewall region a rubber buttress having a substantially axially-outwardly-extending radially inner face the buttress being capable of tangential flexing between the said radially inner face and the sidewall.

The rubber buttress is sufficiently high on the sidewall that when the tire is fully inflated on the rim the rubber buttress rides clear of the rim and is not deflected on to the rim by normal usage. For example, with a textile radial ply tire (185160-13) of aspect ratio 60% the minimum distance between the radially inner face of the rubber buttress and the axially-outwardly-extending rim portions will be approximately 3 mm.

By tangential flexing of the rubber buttress is meant the mode of flexing of the buttress when the sidewall is moved with or against the direction of rotation of the tire relative to the radially inner face of the buttress. This form of flexing will become severe when the tire and wheel assembly is rotated under load with the tire under-inflated or deflated so that the buttress rests on the axially-outwardly-extending rim portions. In the case of a tire without such a buttress the flexing under these conditions can become harmful and damage the tire sidewall by abrasion on the wide rim flanges and in the extreme condition can lead to destruction of the tire sidewall.

The capability of tangential flexing of the buttress without rapid frictional wear may be obtained by forming the buttress, for example, with a series of inwardly directed castellations, or a slotted radially inner surface, the slots lying substantially at right angles to the mid-circumferential plane of the tire.

The tire may be a cross-ply tire, a radial tire or a so-called belted-bias tire, but is preferably a tire having a tread braced by a breaker assembly and more preferably a radial ply tire.

The tread of the tire is preferably wider than the distance between the bead heels when mounted on the wheel rim and the aspect ratio of the tire i.e. the ratio of maximum section height to section width, is preferably low e.g. between 30 and 75% more preferably between 55 and 75%.

The axially-outwardly-extending rim portions may be surfaced with a low friction material to enable relative movement also to occur between the radially inner surface of the buttress and the surface of the rim portion.

The tire and wheel assembly of this invention is intended to be suitable to be run in a deflated condition for some distance e.g. several miles without damage to the tire. To assist in this object the interior of the assembly may be provided with a liquid lubricant as described in our co-pending U.S. application Ser. No. 154,326, filed June 18, 1971, now U.S. Pat. No. 3,739,829, issued June 19, 1973, and/or the interior of the tire may be provided with a coating of lubricant as described in our co-pending U.S. patent application Ser. No. 150,558, filed June 7, 1971, abandoned in favor of U.S. continuation application Ser. No. 443,530, filed Feb. 19, 1974, abandoned in favor of U.S. continuation application Ser. No. 626,707, filed Oct. 29, 1971.

It is important that in this assembly the beads of the tire must not be able to fall into a well on the wheel rim. Thus means are preferably provided for restraining at least the laterally outer bead moving from its seat, particularly if the wheel rim has a well. However, the wheel rim may be of the type in which there is no well e.g. a split rim, or a crimped rim, i.e. a rim in which a well is closed up by axial compression after the tire has been mounted thereon. Suitable means for preventing the bead from moving from its seat are movable studs or projections on the wheel rim or, on a well-based rim, bead locks or spacers which are mounted in the well of the rim.

If desired the wheel rim may be provided between the bead seats with a portion which projects radially outwardly to form a saddle on which the interior surface of the tread portion of the tire can be supported upon partial or complete deflation. This saddle may also act as a bead spacer to prevent bead displacement.

The invention will now be described in more detail, by way of example only, with reference to the accompanying drawings in which.

Figure 1:
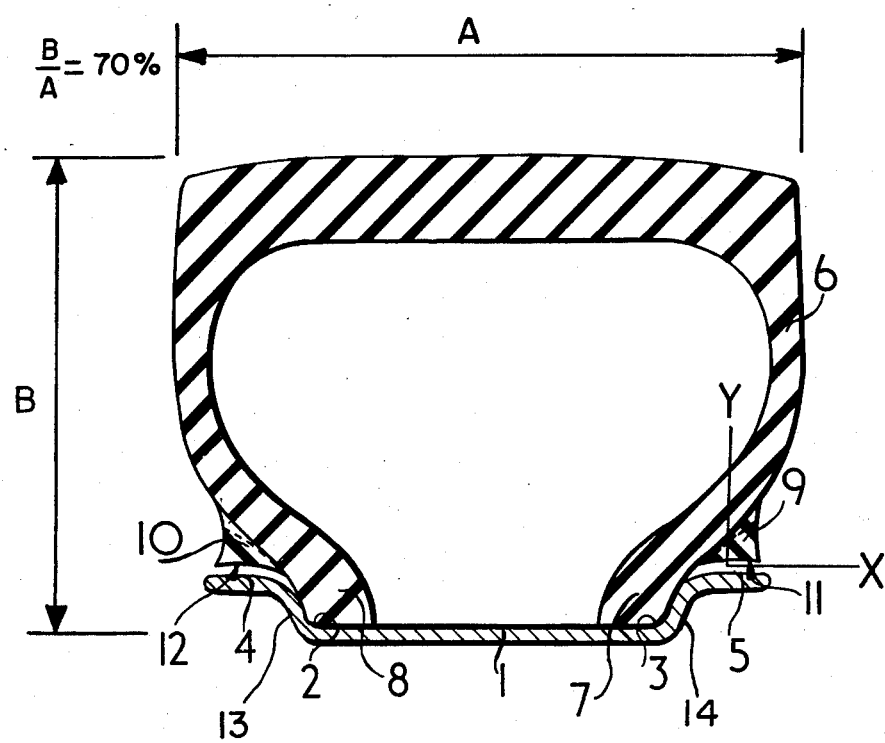
FIG. 1 is a schematic cross-section of part of a tire rim assembly without a well with the tire inflated in which the tire is provided with a rubber buttress in the lower sidewall region.

As shown in FIG. 1 the wheel of a wheel/tire assembly has a rim 1 without a well between a pair of bead seats 2 and 3 and adjacent the bead seats generally radially extending rim flanges 13 and 14. Projecting from the flanges are annular axially-outwardly-extending rim portions 4 and 5.

The tire 6 has a pair of beads 7 and 8 and, in the lower region of each sidewall, rubber buttresses 9 and 10. The radially inner surface 11, 12 of each buttress is substantially axially-outwardly-extending and rides clear of the rim portions 4 and 5.

Figure 2:
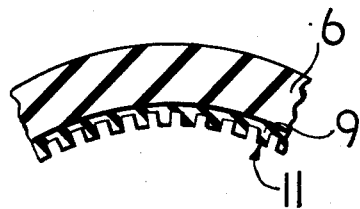
FIG. 2 is a longitudinal section in plane X-Y taken through the radially inner surface of the rubber buttress and FIG. 3 is a schematic cross-section of part of the tire and rim assembly with the tire in its run flat condition with the radially inner face of the buttress shown in contact with the axially outwardly extending rim portions to support the tire sidewall.
Figure 3:
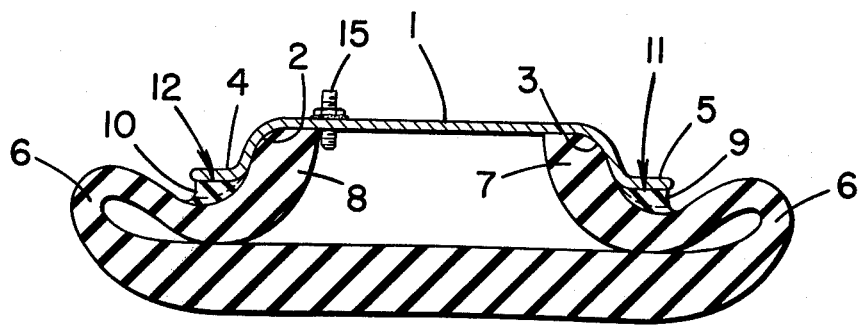

As shown in FIG. 2 when viewed in longitudinal section radially inner surface 11 of the buttress 9 is broken up into a plurality of radially inwardly extending castellations which ensures that the buttresses will flex tangentially relative to the rim portions 4 and 5 when the assembly is run with the tire deflated. As shown in FIG. 3, on deflation of the tire, the radially inner face of each buttress 9 and 10 comes into contact with the axially outwardly extending rim portions of the wheel to support the sidewall of the tire and accommodate relative movement between the wheel rim and the sidewall.

The invention applies to tire and wheel assemblies in which the tire can be removed from the rim or alternatively in which the tire is not removable therefrom, i.e. the two form a permanent assembly, for example, when the rim is swaged over the tire beads after assembly of tire and rim. The aspect ratio, i.e., the ratio of dimension B (radial height) to dimension A (axial width), of the tire is shown in FIG. 1.

Figure 4:
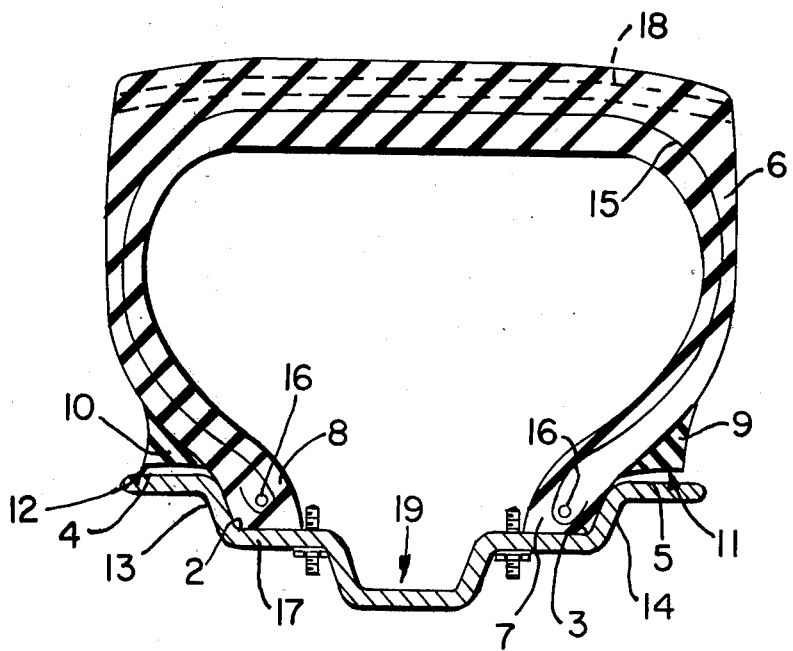
FIG. 4 is a schematic cross-section of part of the tire and rim assembly with the tire inflated and showing a well-based rim, a radial tire, and a tread braced by a breaker assembly.

One example of the previously mentioned means for restraining at least the laterally outer bead from moving from its seat is a bolt 15 (FIG. 3) threaded through the rim in an airtight manner and projecting into the air cavity adjacent one bead. As shown in FIG. 1, the tire has an aspect ratio (B/A) of 70%. As shown in FIG. 4, the tire may be a radial ply tire having a well-based rim 17 which has a well 19 between the bead seats 2 and 3 and radial cords 15 wrapped about bead wires 16. The tire may also have one or more breaker layers 18 beneath the tread portion.

Having now described my invention — what I claim is:

1. A rim and tire assembly comprising:
    a. a rim having a pair of spaced apart bead seats, a generally radially extending rim flange adjacent each bead seat, and an annular rim flange portion extending substantially axially outwardly from each rim flange, each flange portion forming a face against which a sidewall of a deflated tire can be supported;
    b. a tire mounted on said rim, said tire having a tread portion, sidewalls, and bead portions, said tread portion having a width when normally inflated greater than the width of said rim, said bead portions being received on said bead seats within said rim flanges, said tire further comprising, in a radially inner region of one sidewall, an annular rubber buttress of generally right triangular cross-section lying axially inwardly of the edge of the tread portion adjacent said one sidewall and axially outwardly of the bead portion adjacent said one sidewall, said buttress being formed with a series of radially inwardly directed castellations presenting a radially inner substantially axially outwardly extending surface generally parallel to and radially spaced from the rim flange portion adjacent said one sidewall when the tire is normally inflated and carrying a normal load and when the tire is deflated said rubber buttress surface comes into contact with said rim flange portion adjacent said one sidewall and said rubber buttress constitutes a columnar support between said outwardly extending rim portion and said one sidewall which is collapsed, and means for preventing the tire from being dislodged from the rim when running deflated.

2. A rim and tire assembly according to claim 1 in which the tire tread portion is braced by a breaker assembly.

3. A rim and tire assembly according to claim 2 in which the tire is a radial ply tire.

4. A rim and tire assembly according to claim 1 in which the aspect ratio of the tire is between 30 and 75%.

5. A rim and tire assembly according to claim 1 in which the means for preventing the tire from being dislodged from the rim comprises bead retaining means for restraining at least the radially outer bead portion from moving from its seat.

6. A rim and tire assembly according to claim 5 in which the rim is a well-based rim.

7. A rim and tire assembly according to claim 1 in which the means for preventing the tire from being dislodged from the rim is a non-decreasing diameter of the rim between the spacaed apart bead seats so that the rim is without a well into which the tire bead portions can fall.

8. A rim and tire assembly comprising:
    a. a rim having a pair of spaced apart bead seats, a generally radially extending rim flange adjacent each bead seat, and an annular rim flange portion extending substantially axially outwardly from each rim flange, each flange portion forming a face against which a sidewall of a deflated tire can be supported,
    b. a tire mounted on said rim, said tire having a tread portion, sidewalls, and bead portions, said tread portion having a width when normally inflated greater than the width of said rim, said bead portions being receiving on said bead seats within said rim flanges, said tire further comprising, in a radially inner region of one sidewall, an annular rubber buttress of generally right triangular cross-section lying axially inwardly of the edge of the tread portion adjacent said one sidewall and axially outwardly of the bead portion adjacent said one sidewall, said buttress being formed with a series of radially inwardly directed castellations presenting a radially inner substantially axially outwardly extending surface generally parallel to and radially spaced from the rim flange portion adjacent said one sidewall when the tire is normally inflated and carrying a normal load and when the tire is deflated said rubber buttress surface comes into contact with said rim flange portion adjacent said one sidewall and said rubber buttress constitutes a columnar support between said outwardly extending rim portion and said one sidewall which is collapsed, the rim flange portion adjacent said one sidewall and the radially inner substantially axially outwardly extending surface of the buttress being substantially axially coextensive, and means for preventing the tire from being dislodged from the rim when running deflated.

9. A rim and tire assembly comprising:
a. a rim having a pair of spaced apart bead seats, a generally radially extending rim flange adjacent each bead seat, and an annular rim flange portion extending substantially axially outwardly from each rim flange, each flange portion forming a face against which a sidewall of a deflated tire can be supported,
b. a tire mounted on said rim, said tire having a tread portion, sidewalls, and bead portions, said tread portion having a width when normally inflated greater than the width of said rim, said bead portions being received on said bead seats within said rim flanges, said tire further comprising, in a radially inner region of one sidewall, an annular rubber buttress of generally right triangular cross-section lying axially inwardly of the edge of the tread portion adjacent said one sidewall and axially outwardly of the bead portion adjacent said one sidewall, said buttress being formed with a series of radially inwardly directed castellations presenting a radially inner substantially axially outwardly extending surface generally parallel to, substantially radially aligned with, and radially spaced from the rim flange portion adjacent said one sidewall when the tire is normally inflated and carrying a normal load and when the tire is deflated said rubber buttress surface comes into contact with said rim flange portion adjacent said one sidewall and said rubber buttress constitutes a columnar support between said outwardly extending rim portion and said one sidewall which is collapsed, and means for preventing the tire from being dislodged from the rim when running deflated.

10. A rim and tire assembly comprising:
a. a rim having a apair of spaced apart bead seats, a generally radially extending rim flange adjacent each bead seat, and an annular rim flange portion extending substantially axially outwardly from each rim flange, each flange portion forming a face against which a sidewall of a deflated tire can be supported;
b. a tire mounted on said rim, said tire having a tread portion, sidewalls, and bead portions, said tread portion having a width when normally inflated greater than the width of said rim, said bead portions being received on said bead seats within said rim flanges, said tire further comprising, in a radially inner region of one sidewall, an annular rubber buttress of generally right triangular cross-section lying axially inwardly of the edge of the tread portion adjacent said one sidewall and axially outwardly of the bead portion adjacent said one sidewall, said buttress presenting a radially inner substantially axially outwardly extending surface which is slotted, the slots lying substantially at right angles to the mid-circumferential plane of the tire, said surface being generally parallel to and radially spaced from the rim flange portion adjacent said one sidewall when the tire is normally inflated and carrying a normal load and when the tire is deflated said rubber buttress surface comes into contact with said rim flange portion adjacent said one sidewall and said rubber buttress constitutes a columnar support between said outwardly extending rim portion and said one sidewall which is collapsed, and means for preventing the tire from being dislodged from the rim when running deflated.

11. A rim and tire assembly according to claim 10 in which the tire tread portion is braced by a breaker assembly.

12. A rim and tire assembly according to claim 11 in which the tire is a radial ply tire.

13. A rim and tire assembly according to claim 10 in which the aspect ratio of the tire is between 30 and 75%.

14. A rim and tire assembly according to claim 10 in which the means for preventing the tire from being dislodged from the rim comprises bead retaining means for restraining at least the radially outer bead portion from moving its seat.

15. A rim and tire assembly according to claim 14 in which the rim is a well-based rim.

16. A rim and tire assembly according to claim 10 in which the means for preventing the tire from being dislodged from the rim is a non-decreasing diameter of the rim between the spacaed apart bead seats so that the rim is without a well into which the tire bead portions can fall.

17. A rim and tire assembly comprising:
a. a rim having a pair of spaced apart bead seats, a generally radially extending rim flange adjacent each bead seat, and an annular rim flange portion extending substantially axially outwardly from each rim flange, each flange portion forming a face against which a sidewall of a deflated tire can be supported,
b. a tire mounted on said rim, said tire having a tread portion, sidewalls, and bead portions, said tread portion having a width when normally inflated greater than the width of said rim, said bead portions being received on said bead seats within said rim flanges, said tire further comprising, in a radially inner region of one sidewall, an annular rubber buttress of generally right triangular cross-section lying axially inwardly of the edge of the tread portion adjacent said one sidewall and axially outwardly of the bead portion adjacent said one sidewall, said buttress presenting a radially inner substantially axially outwardly extending surface which is slotted, said slots lying substantially at right angles to the mid-circumferential plane of the tire, said surface being generally parallel to and radially spaced from the rim flange portion adjacent said one sidewall when the tire is normally inflated and carrying a normal load and when the tire is deflated said rubber buttress surface comes into contact with said rim flange portion adjacent said one sidewall and said rubber buttress constitutes a columnar support between said outwardly extending rim portion and said one sidewall which is collapsed, the rim flange portion adjacent said one sidewall and the radially inner substantially axially outwardly extending surface of the buttress being substantially axially coextensive, and means for preventing the tire from being dislodged from the rim when running deflated.

18. A rim and tire assembly comprising:
a. a rim having a pair of spaced apart bead seats, a generally radially extending rim flange adjacent each bead seat, and an annular rim flange portion extending substantially axially outwardly from each rim flange, each flange portion forming a face against which a sidewall of a deflated tire can be supported,
b. a tire mounted on said rim, said tire having a tread portion, sidewalls, and bead portions, said tread portion having a width when normally inflated greater than the width of said rim, said bead portions being received on said bead seats within said rim flanges, said tire further comprising, in a radially inner region of one sidewall, an annular rubber buttress of generally right triangular cross-section lying axially inwardly of the edge of the tread portion adjacent said one sidewall and axially outwardly of the bead portion adjacent said one sidewall, said buttress presenting a radially inner substantially axially outwardly extending surface which is slotted, the slots lying substantially at right angles to the mid-circumferential plane of the tire, said surface being generally parallel to, substantially radially aligned with, and radially spaced from the rim flange portion adjacent said one sidewall when the tire is normally inflated and carrying a normal load and when the tire is deflated said rubber buttress surface comes into contact with said rim flange portion adjacent said one sidewall and said rubber buttress constitutes a columnar support between said outwardly extending rim portion and said one sidewall which is collpased, and means for preventing the tire from being dislodged from the rim when running deflated.

* * * * *